United States Patent
Volny et al.

(10) Patent No.: US 10,167,087 B2
(45) Date of Patent: Jan. 1, 2019

(54) COLLAPSIBLE INFLATABLE ASPIRATOR SYSTEM

(71) Applicant: Goodrich Corporation, Charlotte, NC (US)

(72) Inventors: Jaro S. Volny, Phoenix, AZ (US); Drew Hartman, Phoenix, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 251 days.

(21) Appl. No.: 15/130,758

(22) Filed: Apr. 15, 2016

(65) Prior Publication Data
US 2017/0297726 A1 Oct. 19, 2017

(51) Int. Cl.
*B64D 25/14* (2006.01)
*F04F 5/14* (2006.01)
*F04F 5/18* (2006.01)

(52) U.S. Cl.
CPC ............ *B64D 25/14* (2013.01); *F04F 5/14* (2013.01); *F04F 5/18* (2013.01)

(58) Field of Classification Search
CPC ..... B64D 25/14; F04F 5/14; F04F 5/18; F04F 5/463; F04F 5/466
USPC ............... 244/137.2; 137/223; 417/179, 191
See application file for complete search history.

(56) References Cited

U.S. PATENT DOCUMENTS

| | | | | |
|---|---|---|---|---|
| 3,370,784 A | * | 2/1968 | Day | B63C 9/24 137/223 |
| 3,460,746 A | * | 8/1969 | Forsythe | E04H 15/20 137/223 |
| 3,468,472 A | * | 9/1969 | Hahn | F04F 5/461 137/223 |
| 3,640,645 A | * | 2/1972 | Forsythe | B63C 9/18 417/174 |

(Continued)

FOREIGN PATENT DOCUMENTS

| | | |
|---|---|---|
| EP | 0046275 | 2/1982 |
| WO | 8302981 | 9/1983 |

OTHER PUBLICATIONS

EP Search report dated Oct. 9, 2017 in EP Application No. 17163658.2.

(Continued)

*Primary Examiner* — Richard R. Green
*Assistant Examiner* — Brady W Frazier
(74) *Attorney, Agent, or Firm* — Snell & Wilmer, L.L.P.

(57) ABSTRACT

An aspirator system for inflating an inflatable evacuation device includes an aspirator body having a plurality of flapper doors configured to open to allow intake of atmospheric gas. The aspirator system also includes an aspirator barrel connecting the aspirator body to the inflatable evacuation device, having connected inflation chambers wrapping around a circumference of the aspirator barrel and arranged along a length of the aspirator barrel, and being configured to provide an aspirator barrel chamber for guiding the atmospheric gas to the inflatable evacuation device when the (Continued)

aspirator barrel is inflated. The aspirator system also includes a showerhead nozzle connected to the connected inflation chambers, configured to direct high-pressure gas to inflate the aspirator barrel and compel intake of atmospheric gas through the plurality of flapper doors, to inflate the inflatable evacuation device.

13 Claims, 7 Drawing Sheets

(56) References Cited

U.S. PATENT DOCUMENTS

| | | | | |
|---|---|---|---|---|
| 3,684,404 | A * | 8/1972 | Galbraith | F04F 5/466 |
| | | | | 417/179 |
| RE27,860 | E * | 1/1974 | Day | B64D 25/14 |
| | | | | 244/905 |
| 3,791,764 | A * | 2/1974 | Summer | F04F 5/18 |
| | | | | 138/45 |
| 3,860,984 | A | 1/1975 | Fisher | |
| 3,904,324 | A * | 9/1975 | Flatt | F04D 25/045 |
| | | | | 137/527 |
| 4,368,009 | A * | 1/1983 | Heimovics, Jr. | B61B 12/005 |
| | | | | 417/179 |
| 4,566,862 | A * | 1/1986 | Halavais | F04F 5/48 |
| | | | | 417/174 |
| 5,002,465 | A * | 3/1991 | Lagen | F04F 5/466 |
| | | | | 417/181 |
| 6,004,176 | A * | 12/1999 | Moran | B64D 25/14 |
| | | | | 417/191 |
| 6,071,084 | A * | 6/2000 | Wass | F04F 5/463 |
| | | | | 137/888 |
| 6,199,676 | B1 * | 3/2001 | Targiroff | B64D 25/14 |
| | | | | 156/322 |
| 8,066,493 | B2 | 11/2011 | Renz et al. | |
| 9,011,195 | B2 | 4/2015 | Sidwell | |
| 9,863,442 | B2 * | 1/2018 | Ruegsegger | F04F 5/463 |
| 2010/0266424 | A1 * | 10/2010 | Renz | F04F 5/463 |
| | | | | 417/191 |
| 2016/0058218 | A1 * | 3/2016 | Yoshifusa | A47G 9/1027 |
| | | | | 428/12 |

OTHER PUBLICATIONS

European Patent Office, European Intent to Grant dated Jun. 20, 2018 in Application No. 17163658.2-1004.

* cited by examiner

COLLAPSIBLE INFLATABLE ASPIRATOR SYSTEM

FIELD

The present disclosure is directed to evacuation systems for use in aircraft and, more particularly, to aspirators designed to provide air for inflating evacuation devices.

BACKGROUND

Inflatable emergency evacuation devices such as aircraft evacuation slides and emergency life rafts typically include a charged gas cylinder and an aspirator. The aspirator, working with the charged gas cylinder, provides air to inflate the emergency evacuation devices. Aspirators are typically stored in a limited packing space and thus the evacuation device package is often densely packaged. The process of packaging the evacuation device so densely may lead to various issues including cracked aspirators, which may be fragile.

SUMMARY

Described herein is an aspirator system for inflating an inflatable evacuation device. The aspirator system includes an aspirator body having a plurality of flapper doors configured to open to allow intake of atmospheric gas. The aspirator system also includes an aspirator barrel connecting the aspirator body to the inflatable evacuation device, having connected inflation chambers wrapping around a circumference of the aspirator barrel and arranged along a length of the aspirator barrel, and being configured to provide an aspirator barrel chamber for guiding the atmospheric gas to the inflatable evacuation device when the aspirator barrel is inflated. The aspirator system also includes a showerhead nozzle disposed within the aspirator body, connected to the connected inflation chambers, configured to direct a first portion of high-pressure gas to the connected inflation chambers to inflate the aspirator barrel, and configured to direct a second portion of high-pressure gas through the aspirator barrel and compel intake of atmospheric gas through the plurality of flapper doors, to inflate the inflatable evacuation device.

In any of the foregoing embodiments, the aspirator barrel is made of a fabric.

In any of the foregoing embodiments, the aspirator barrel is configured to be compacted when not inflated.

In any of the foregoing embodiments, the aspirator barrel comprises a relief valve configured to release gas into the aspirator barrel chamber when a pressure inside the connected inflation chambers exceeds a threshold pressure.

In any of the foregoing embodiments, the showerhead nozzle is connected to the connected inflation chambers at a single point.

In any of the foregoing embodiments, the showerhead nozzle is connected to the connected inflation chambers at a plurality of points.

In any of the foregoing embodiments, the aspirator barrel is generally cylindrically shaped.

In any of the foregoing embodiments, the aspirator barrel comprises a first end connected to the aspirator body and a second end connected to the inflatable evacuation device, and wherein a diameter of the aspirator barrel at the first end is smaller than a diameter of the aspirator barrel at the second end.

In any of the foregoing embodiments, the connected inflation chambers are separated by a plurality of seams.

In any of the foregoing embodiments, a shape of the plurality of seams resembles rings arranged along the length of the aspirator barrel.

In any of the foregoing embodiments, a shape of the plurality of seams resembles a helix along the length of the aspirator barrel.

Also described is an aspirator barrel of an aspirator system. The aspirator barrel includes connected inflation chambers wrapping around a circumference of the aspirator barrel and arranged along a length of the aspirator barrel, the connected inflation chambers connected to a showerhead nozzle configured to direct high-pressure gas to the connected inflation chambers such that the aspirator barrel is inflated. The aspirator barrel further includes an aspirator barrel chamber for guiding atmospheric gas from a first end of the aspirator barrel to a second end, the aspirator barrel chamber defined by the aspirator barrel when the aspirator barrel is inflated. The aspirator barrel further includes a relief valve configured to release high-pressure gas into the aspirator barrel chamber when a pressure inside the connected inflation chambers exceeds a threshold pressure.

In any of the foregoing embodiments, a diameter of the aspirator barrel at the first end is smaller than a diameter of the aspirator barrel at the second end.

Also described in an airplane. The airplane includes an inflatable evacuation device configured to be inflated when deployed. The airplane also includes a charged gas cylinder configured to provide high-pressure gas for inflating the inflatable evacuation device. The airplane also includes an aspirator system. The aspirator system includes an aspirator body having a plurality of flapper doors configured to open to allow intake of atmospheric gas. The aspirator system also includes an aspirator barrel connecting the aspirator body to the inflatable evacuation device, having connected inflation chambers wrapping around a circumference of the aspirator barrel and arranged along a length of the aspirator barrel, and being configured to provide an aspirator barrel chamber for guiding the atmospheric gas to the inflatable evacuation device when the aspirator barrel is inflated. The aspirator system also includes a showerhead nozzle disposed within the aspirator body, connected to the connected inflation chambers, configured to direct a first portion of the high-pressure gas from the charged gas cylinder to the connected inflation chambers to inflate the aspirator barrel, and configured to direct a second portion of the high-pressure gas from the charged gas cylinder through the aspirator barrel and compel intake of atmospheric gas through the plurality of flapper doors, to inflate the inflatable evacuation device.

In any of the foregoing embodiments, the connected inflation chambers are separated by a plurality of seams resembling a helix along the length of the aspirator barrel.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Aspirators are an important component to an inflatable evacuation system's performance. Aspirators draw atmospheric gas into the inflatable device during inflation to supplement the high-pressure gas provided by the charged gas cylinder. The high-pressure gas entering an aspirator chamber of an aspirator body causes the pressure in the aspirator chamber to fall below atmospheric pressure. As a result, atmospheric gas is drawn into the aspirator chamber and enters the inflatable evacuation device via an aspirator barrel connecting the aspirator body to the inflatable evacuation device.

Aspirator barrels are rigid despite the low pressure environment within them. Therefore, they may be created from materials such as a metal or reinforced plastic. Being created from rigid materials, aspirators may be bulky and occupy substantial volume. The volume occupied by the aspirator may be an issue when packing inflatable evacuation devices, as aspirators can take up to about 25% or more of the available volume in the inflatable evacuation device pack. More volume occupied by the aspirator leads to higher pack densities and can present issues when manufacturing.

Figure 1:
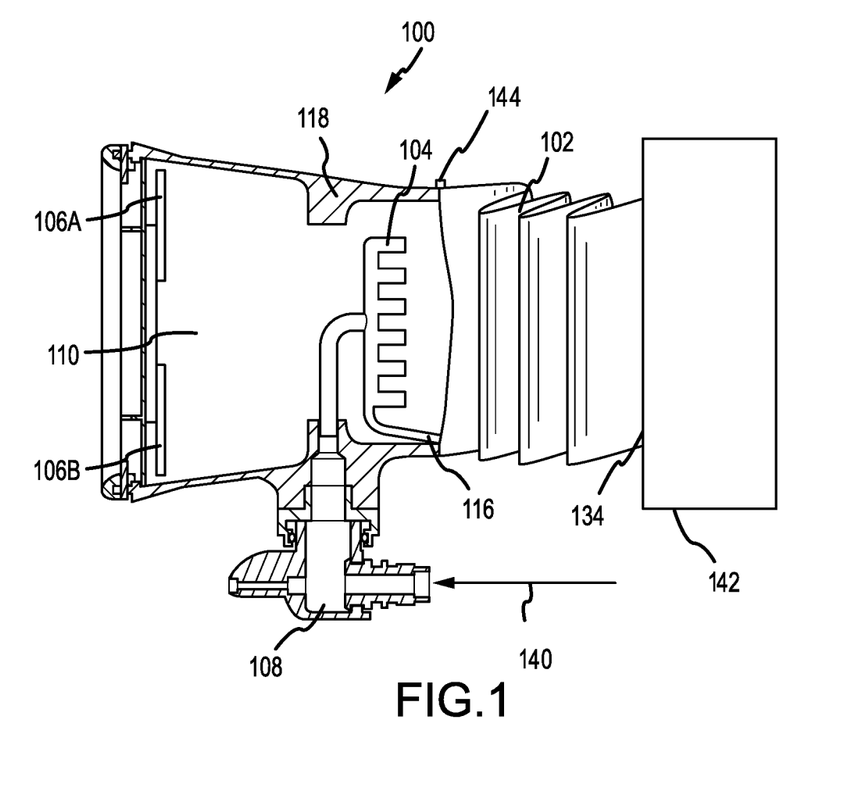
FIG. 1 is a drawing of a partial cross section of a collapsible and inflatable aspirator system, in accordance with various embodiments.
Figure 2:
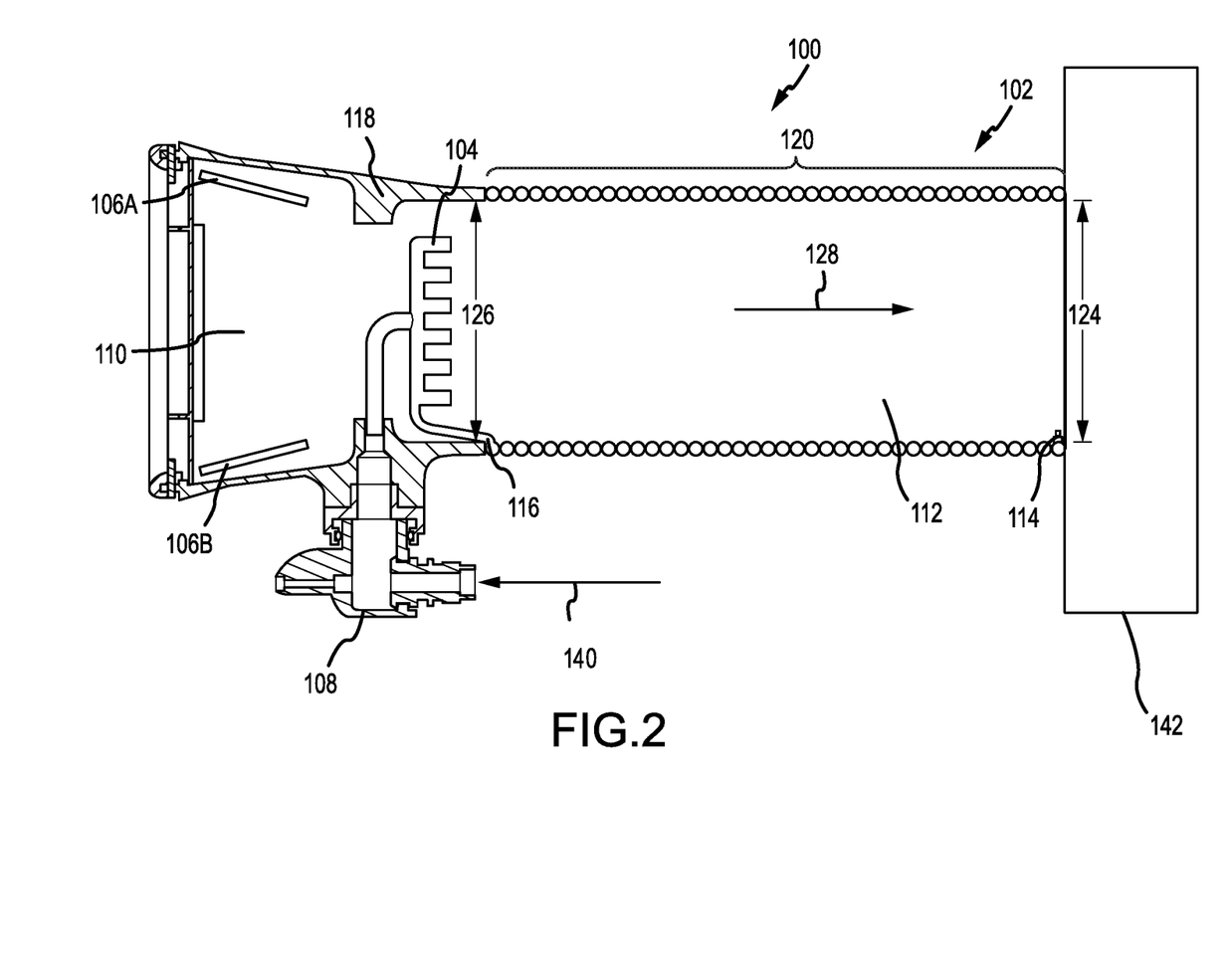
FIG. 2 is a drawing of a cross section of a collapsible and inflatable aspirator system, in accordance with various embodiments.

Turning now to FIG. 1, a collapsible and inflatable aspirator system 100 is shown. The collapsible and inflatable aspirator system 100 includes an aspirator body 118, whose cross section is shown, connected to an aspirator barrel 102. The aspirator barrel 102 is capable of being in an uninflated state (as shown in FIG. 1) and also capable of being in an inflated state (as shown in FIG. 2). The aspirator barrel 102 may comprise a flexible fabric. In various embodiments, the flexible fabric is the same type of flexible fabric used in the inflatable evacuation device 142. In various embodiments, the flexible fabric has a high tensile strength and is made of, for example an aramid and/or para-aramid fiber. Being made of a flexible fabric, in an uninflated state, the aspirator barrel 102 is capable of being folded, rolled up, or otherwise compacted.

The aspirator body 118 includes a showerhead nozzle 104, flapper doors 106A-106B, and a gas valve 108. The showerhead nozzle 104 is connected to the gas valve 108. The gas valve 108 directs high-pressure gas from a gas source 140, such as a charged cylinder, through the showerhead nozzle 104 and into an aspirator chamber 110. The aspirator chamber 110 is defined by the aspirator body 118. The aspirator body 118 may be made of a rigid material, such as plastic or metal, in order to protect the gas valve 108, the showerhead nozzle 104, and the flapper doors 106A-106B, as well as ensuring the aspirator chamber 110 is defined.

When high-pressure gas moves from the gas source 140 to the aspirator chamber 110 via the gas valve 108 and the showerhead nozzle 104, atmospheric gas is compelled into the aspirator chamber 110 from outside the collapsible and inflatable aspirator system 100 due to the Venturi effect. The atmospheric gas enters the aspirator chamber 110 through flapper doors 106A-106B.

The flapper doors 106A-106B are configured to open inward to allow compelled atmospheric gas to enter the aspirator chamber 110. The flapper doors 106A-106B are also configured to keep the atmospheric gas from exiting the aspirator chamber 110 via the flapper doors 106A-106B by being a one-way valve. As shown in FIG. 1, the flapper doors 106A-106B are in a closed configuration, as high-pressure gas is not being provided to the aspirator chamber 110 via the gas valve 108 and the showerhead nozzle 104.

The aspirator barrel 102 is connected to the aspirator body 118 at one end, and connected to an inflatable evacuation device 142 at the other end 134. The aspirator barrel 102 may be connected to the aspirator body by wrapping a band clamp 144 around a flange connection between the aspirator body 118 and the aspirator barrel 102. The showerhead nozzle 104 provides the high-pressure gas from the gas source 140 and is connected to the aspirator barrel 102 via aspirator barrel inflation connector 116. The showerhead nozzle 104 provides a first portion of the high-pressure gas to the aspirator barrel inflation connector 116 and provides a second portion of the high-pressure gas to the aspirator chamber 110 to compel atmospheric gas to enter via the flapper doors 106A-106B. In various embodiments, the aspirator barrel inflation connector 116 is a flexible tube. In various embodiments, the aspirator barrel inflation connector 116 is a rigid pipe. The aspirator barrel inflation connector 116 is housed entirely within the aspirator body 118.

Turning now to FIG. 2, a cross section of the collapsible and inflatable aspirator system 100 with an inflated aspirator barrel 102 is shown. When the gas valve 108 is opened and high-pressure gas enters the showerhead nozzle 104, a portion of the high-pressure gas fills the aspirator barrel 102 via the aspirator barrel inflation connector 116, and the aspirator barrel 102 inflates. Inflating of the aspirator barrel 102 results in an aspirator barrel chamber 112 being defined by the aspirator barrel 102.

Figure 3:
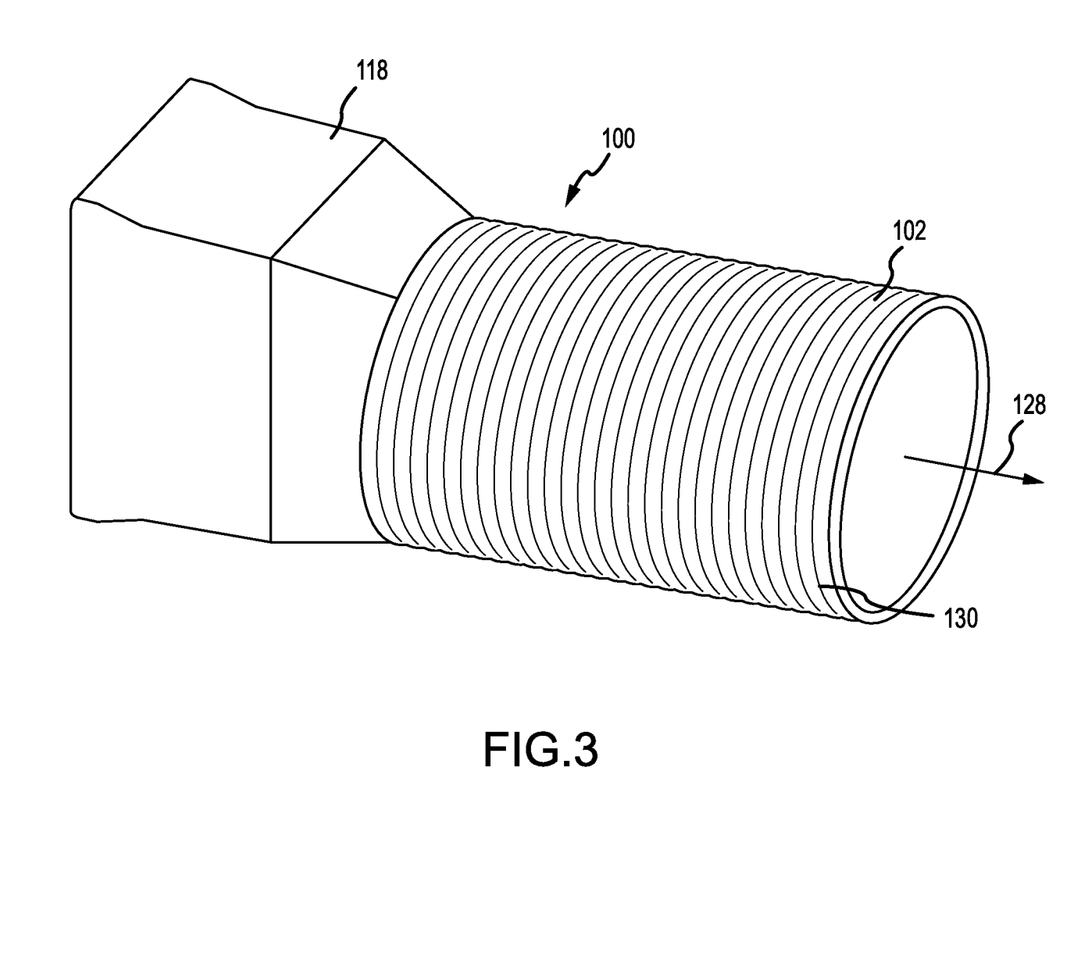
FIG. 3 is a drawing of a collapsible and inflatable aspirator system with seams resembling multiple rings, in accordance with various embodiments.
Figure 4:
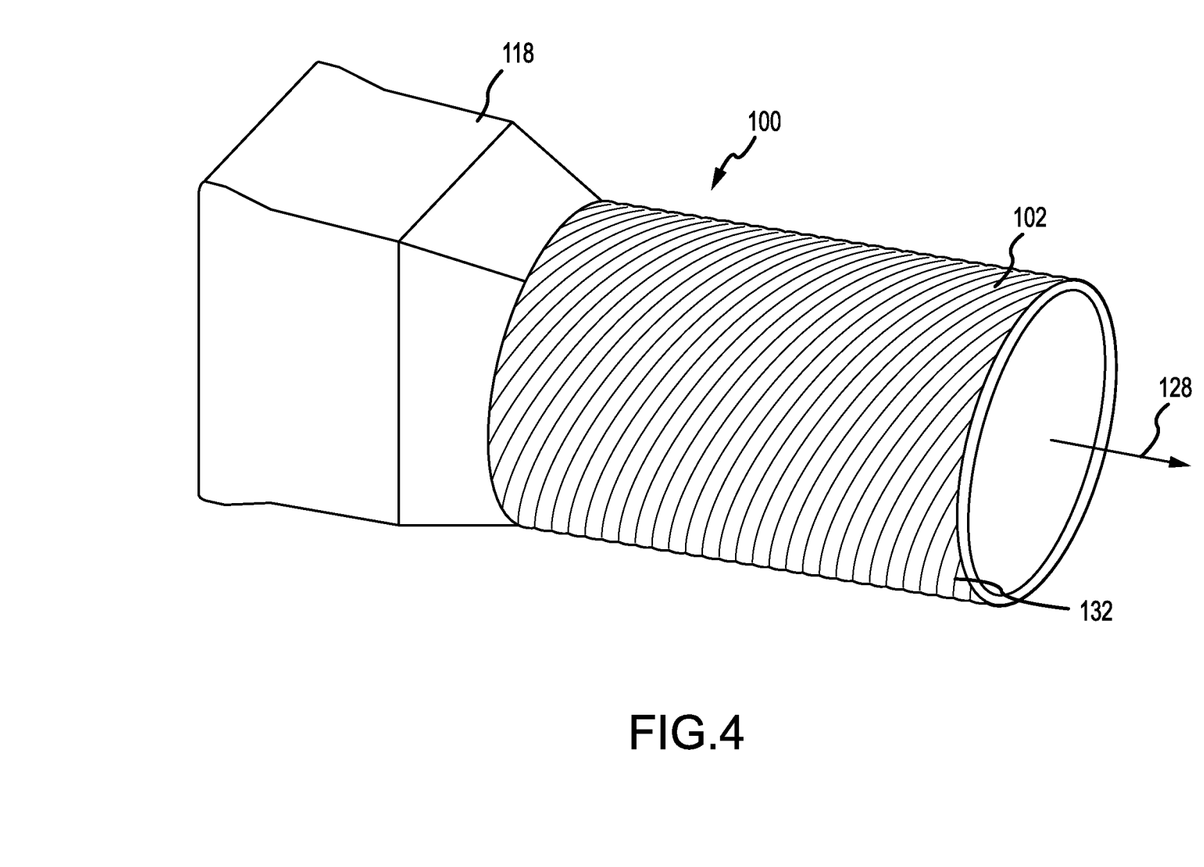
FIG. 4 is a drawing of a collapsible and inflatable aspirator system with seams resembling a helix, in accordance with various embodiments.

The aspirator barrel 102 may include a number of connected inflation chambers 120. In various embodiments, the aspirator barrel 102 is comprised entirely of the connected inflation chambers 120. The connected inflation chambers 120 may be arranged in different patterns, as shown in FIGS. 3 and 4. However, generally, the connected inflation chambers 120 are disposed around the circumference of the aspirator barrel 102 and along the length of the aspirator barrel 102. In addition, when viewing a cross section of the collapsible and inflatable aspirator system 100, as shown in FIG. 2, the connected inflation chambers 120 generally exhibit a circular pattern aligned along the length of the aspirator barrel 102. The connected inflation chambers 120 are connected together via one or more openings to allow gas to pass through from one inflation chamber to another. As a result of being connected, all the connected inflation chambers 120 are inflated despite the high-pressure gas entering the aspirator barrel 102 at a single location (via aspirator barrel inflation connector 116). In various embodiments, the showerhead nozzle 104 has multiple aspirator barrel inflation connectors, such that the aspirator barrel 102 is connected to the showerhead nozzle 104 at many points, allowing for faster inflation of the connected inflation chambers 120.

The aspirator barrel 102 includes a relief valve 114. The relief valve 114 is configured to allow some of the high-pressure gas to enter the aspirator barrel chamber 112. In various embodiments, the relief valve 114 is a one-way valve that opens when the pressure in the connected inflation chambers 120 of the aspirator barrel 102 exceeds a threshold value. By allowing some of the high-pressure gas to be released, damage to the aspirator barrel 102 from over-inflation of the connected inflation chambers 120 is reduced or eliminated. Further, by allowing the excess high-pressure gas to enter the aspirator barrel chamber 112 and eventually fill the inflatable device, high-pressure gas is not wasted.

In various embodiments, the relief valve 114 is simply an opening, such that the high-pressure gas from the gas source 140 travels through the showerhead nozzle 104, through the aspirator barrel inflation connector 116, inflates the connected inflation chambers 120 of the aspirator barrel 102, travels through the connected inflation chambers 120, and eventually enters the inflatable evacuation device 142 via aspirator barrel chamber 112. The respective diameters of the relief valve 114 and the opening of the aspirator barrel inflation connector 116 may be tuned in such a way that the aspirator barrel 102 remains inflated with a specified rigidity while the high-pressure gas travels through the connected inflation chambers 120 of the aspirator barrel 102.

In addition to providing high-pressure gas for inflating the connected inflation chambers 120 of aspirator barrel 102, when the gas valve 108 opens and high-pressure gas enters the showerhead nozzle 104, atmospheric gas enters the aspirator chamber 110 via flapper doors 106A-106B (in an open state) and atmospheric gas and high-pressure gas is provided in a direction 128 toward the inflatable evacuation device 142, through the aspirator barrel chamber 112 defined by the aspirator barrel 102 in an inflated state. The diameter of the aspirator barrel entrance opening 126 is substantially the same as the diameter of the aspirator barrel exit opening 124.

FIG. 3 shows a perspective view of the collapsible and inflatable aspirator system 100 with an inflated aspirator barrel 102. As described herein, the aspirator barrel 102 is connected to the aspirator body 118 and provides atmospheric gas and high-pressure gas in a direction 128 toward the inflatable evacuation device.

The connected inflation chambers 120 (shown in FIG. 2) of the aspirator barrel 102 are connected together to allow gas to pass through from one chamber to the next, but the connected inflation chambers 120 are also separated by seams 130. Seams 130 follow a pattern such that the connected inflation chambers 120 of the aspirator barrel 102 are aligned next to each other in a row, along the length of the aspirator barrel 102, with the diameters of the connected inflation chambers 120 being perpendicular to an axis along the length of the aspirator barrel 102. In various embodiments, the aspirator barrel 102 is created using two sheets of fabric and bonding them together to create the seams 130 and the shape of the aspirator barrel 102. The seams 130 may be made by bonding a first fabric comprising the outer surface area of the aspirator barrel 102 with a second fabric comprising an inner surface area of the aspirator barrel 102, in lines. The bonding may be achieved by applying an adhesive or by joining the fabric together using heat.

FIG. 4 shows the collapsible and inflatable aspirator system 100 with an inflated aspirator barrel 102. As described herein, the aspirator barrel 102 is connected to the aspirator body 118 and provides gas in a direction 128 toward the inflatable evacuation device.

The seams 132 in FIG. 4 follow a swirling or helix pattern, as compared to the seams 130 in FIG. 3. Having a helix pattern may allow the aspirator barrel 102 to inflate more evenly, as each inflation chamber of the connected inflation chambers 120 covers more of the surface area of the aspirator barrel 102.

Figure 5:
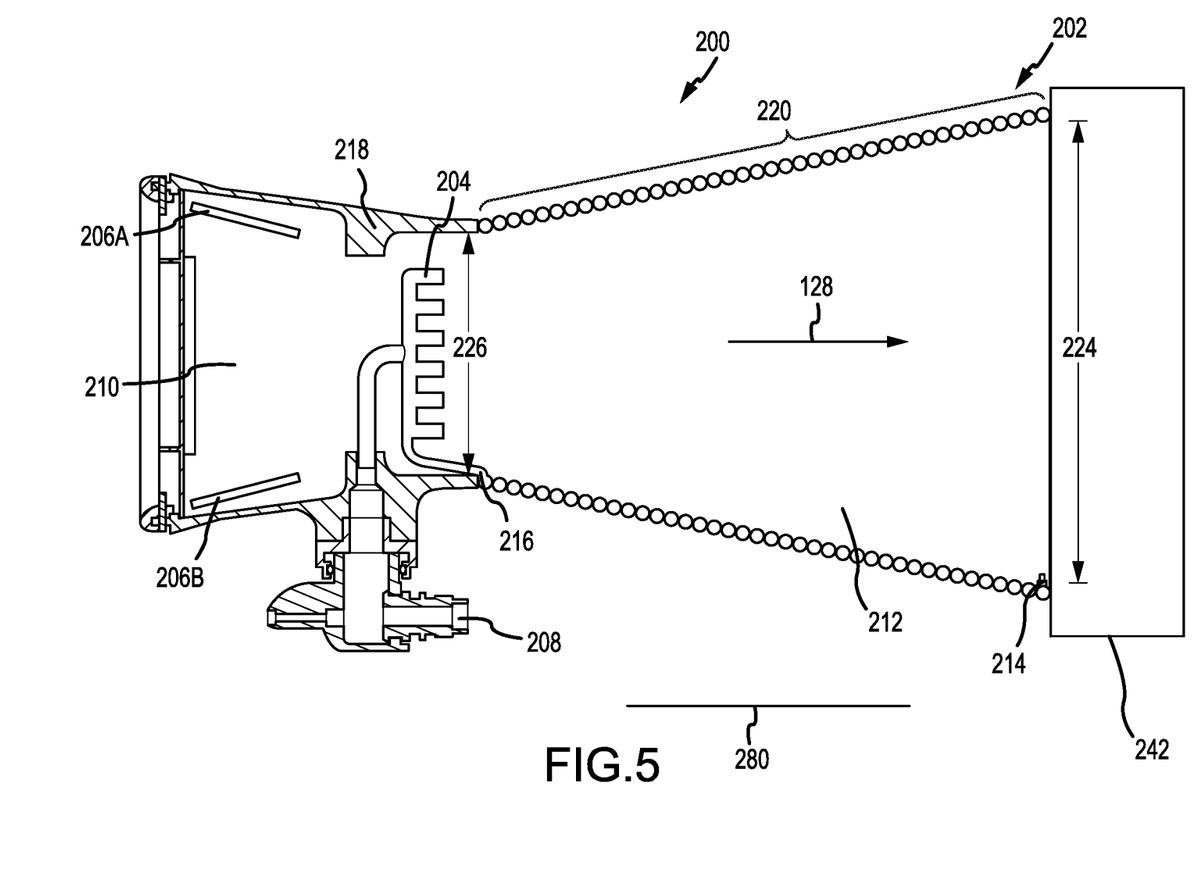
FIG. 5 is a drawing of a cross section of a collapsible and inflatable aspirator system with a diffused opening, in accordance with various embodiments.

FIG. 5 shows a cross section of collapsible and inflatable aspirator system 200. The collapsible and inflatable aspirator system 200 has elements in common with collapsible and inflatable aspirator system 100 shown in FIGS. 1-4, which are numbered similarly. Collapsible and inflatable aspirator system 200 includes an aspirator body 218 which houses a showerhead nozzle 204, a gas valve 208, flapper doors 206A-206B, and aspirator barrel inflation connector 216. The aspirator body 218 defines an aspirator chamber 210, and atmospheric gas and high-pressure gas is provided to the inflatable evacuation device 242 in direction 128. High-pressure gas enters connected inflation chambers 220 via aspirator barrel inflation connector 216.

The cross section of aspirator barrel 202 illustrates the connected inflation chambers 220 exhibiting a pattern of round chambers alongside each other along the length of the aspirator barrel 202. In various embodiments, the connected inflation chambers 220 resemble rings and the diameters of each of the connected inflation chambers 220 are perpendicular to an axis 280 along the length of the aspirator barrel 202. Unlike the generally cylindrically shaped aspirator barrel 102 of FIG. 2, the aspirator barrel 202 of FIG. 5 exhibits a shape where the diameter of the aspirator barrel 102 increases as gas travels in the direction 128 toward the inflatable evacuation device. The shape of aspirator barrel 202 may generally resemble a frustum. By having the diameter of the aspirator barrel 102 increase as the gas travels in direction 128, diffusion of the atmospheric gas and high-pressure gas is created, achieving improved inflation of the inflatable evacuation device by reducing scavenging effects during inflation when atmospheric gas and high-pressure gas travels quickly through aspirator barrel chamber 212 in direction 128.

Figure 6:
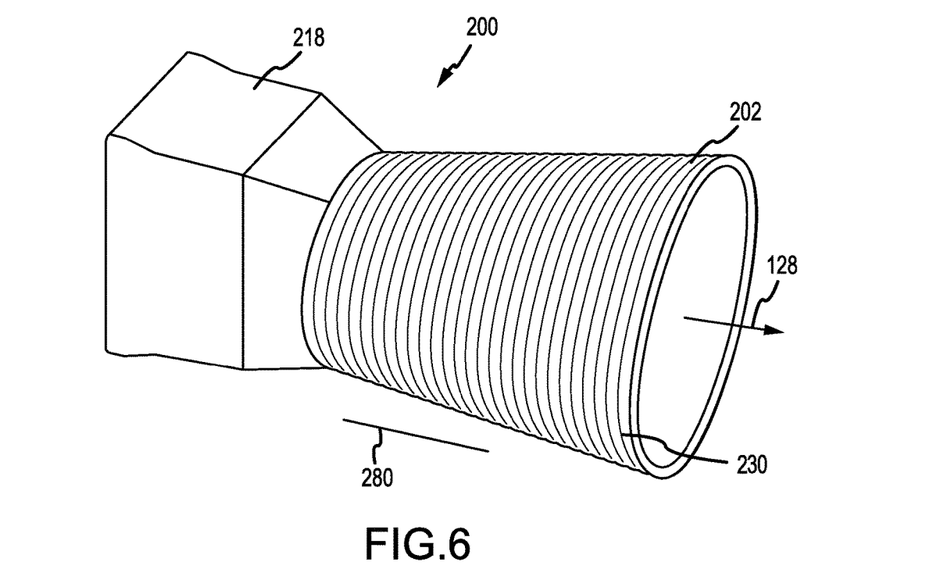
FIG. 6 is a drawing of a collapsible and inflatable aspirator system with seams resembling multiple rings and a diffused opening, in accordance with various embodiments.

FIG. 6 shows a perspective view of the collapsible and inflatable aspirator system 200 with an inflated aspirator barrel 202. As described herein, the aspirator barrel 202 is connected to the aspirator body 218 and provides atmospheric gas and high-pressure gas in a direction 128 toward the inflatable evacuation device.

Similar to the seams 130 of FIG. 3, seams 230 of FIG. 6 follow a pattern such that the connected inflation chambers 220 (shown in FIG. 5) of the aspirator barrel 202 are aligned next to each other in a row, along the length of the aspirator barrel 202, with the diameters of each of the connected inflation chambers 220 being perpendicular to an axis 280 along the length of the aspirator barrel 202.

Figure 7:
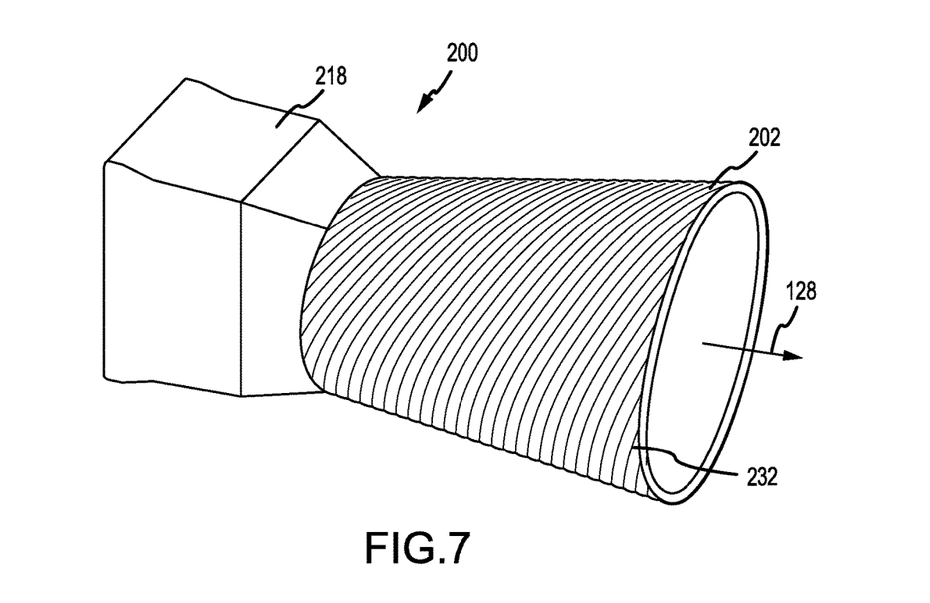
FIG. 7 is a drawing of a collapsible and inflatable aspirator system with seams resembling a helix and a diffused opening, in accordance with various embodiments.

FIG. 7 shows a perspective view of the collapsible and inflatable aspirator system 200 with an inflated aspirator barrel 202. As described herein, the aspirator barrel 202 is connected to the aspirator body 218 and provides atmospheric gas and high-pressure gas in a direction 128 toward the inflatable evacuation device.

Similar to the seams 132 of FIG. 4, the seams 232 in FIG. 7 follow a swirling or helix pattern, as compared to the seams 230 in FIG. 6. Having a helix pattern may allow the aspirator barrel 202 to inflate more evenly, as each inflation chamber of the connected inflation chambers 220 covers more of the surface area of the aspirator barrel 202.

Figure 8:
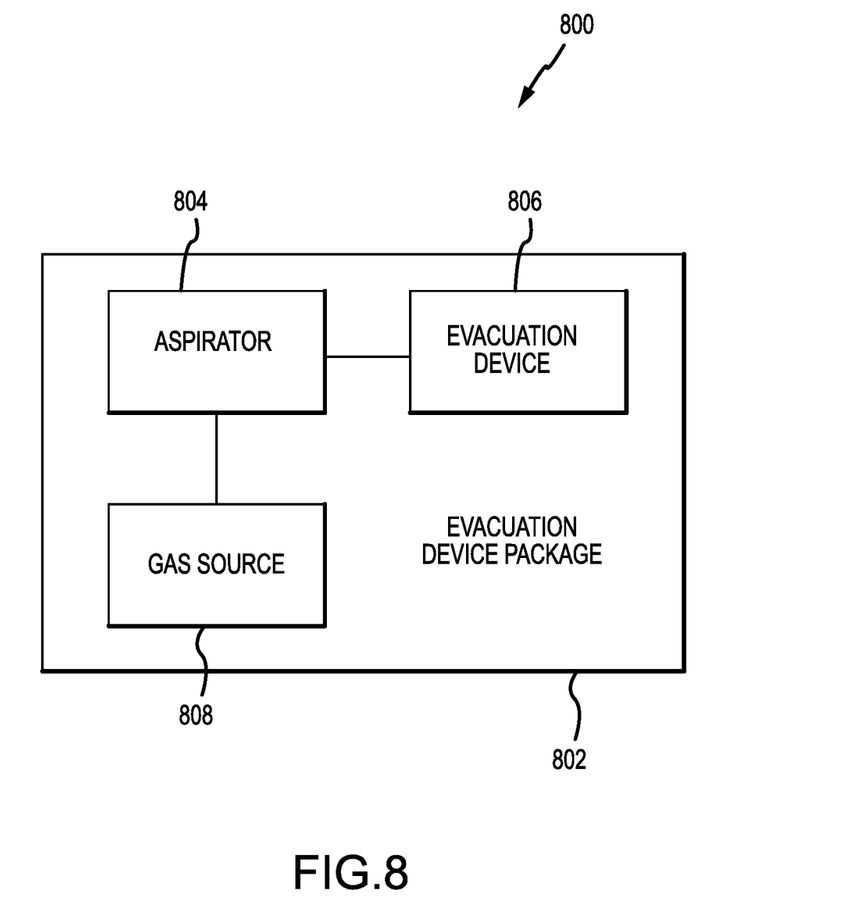
FIG. 8 is a block diagram of an airplane with a collapsible and inflatable aspirator system, in accordance with various embodiments.

FIG. 8 is a diagram of a system using the collapsible and inflatable aspirator system. The system includes an airplane 800. The airplane 800 has an evacuation device package 802. In various embodiments, the evacuation device package 802 is tightly packed to minimize space in the fuselage of the airplane 800.

The evacuation device package 802 includes an aspirator 804. In various embodiments, the aspirator 804 is a collapsible and inflatable aspirator system similar to collapsible and inflatable aspirator system 100 and collapsible and inflatable aspirator system 200. The aspirator 804 is connected to a gas source 808. In various embodiments, the gas source 808 is a charged gas cylinder. The aspirator 804 is also connected to an evacuation device 806. In various embodiments, the evacuation device 806 is an inflatable evacuation device, as described herein.

In various embodiments, in an emergency evacuation situation, the airplane 800 deploys the evacuation device 806. In various embodiments, deploying the evacuation device 806 includes opening the evacuation device package 802 and configuring gas source 808 to provide high-pressure gas to aspirator 804. In turn, the aspirator 804, using the high-pressure gas and atmospheric gas, inflates the evacuation device 806. In various embodiments, the evacuation device 806 is an inflatable slide that passengers may use to exit the airplane 800 in a controlled manner. In various embodiments, the evacuation device 806 is an inflatable raft that passengers may occupy in an emergency situation.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aspirator system for inflating an inflatable evacuation device, the aspirator system comprising:
    an aspirator body having a plurality of flapper doors configured to open to allow intake of atmospheric gas;
    an aspirator barrel connecting the aspirator body to the inflatable evacuation device, having connected inflation chambers wrapping around a circumference of the aspirator barrel and arranged along a length of the aspirator barrel, and being configured to provide an aspirator barrel chamber for guiding the atmospheric gas to the inflatable evacuation device in response to the aspirator barrel being inflated; and
    a showerhead nozzle disposed within the aspirator body, connected to the connected inflation chambers, configured to direct a first portion of high-pressure gas to the connected inflation chambers to inflate the aspirator barrel, and configured to direct a second portion of high-pressure gas through the aspirator barrel and compel intake of atmospheric gas through the plurality of flapper doors, to inflate the inflatable evacuation device;

wherein the aspirator barrel comprises a relief valve configured to release gas into the aspirator barrel chamber in response to a pressure inside the connected inflation chambers exceeding a threshold pressure.

2. The aspirator system of claim 1, wherein the aspirator barrel is made of a flexible fabric.

3. The aspirator system of claim 1, wherein the aspirator barrel is configured to be compacted when not in an inflated state.

4. The aspirator system of claim 1, wherein the showerhead nozzle is connected to the connected inflation chambers at a single point.

5. The aspirator system of claim 1, wherein the showerhead nozzle is connected to the connected inflation chambers at a plurality of points.

6. The aspirator system of claim 1, wherein the aspirator barrel is generally cylindrically shaped.

7. The aspirator system of claim 1, wherein the aspirator barrel comprises a first end connected to the aspirator body and a second end connected to the inflatable evacuation device, and wherein a diameter of the aspirator barrel at the first end is smaller than a diameter of the aspirator barrel at the second end.

8. The aspirator system of claim 1, wherein the connected inflation chambers are separated by a plurality of seams.

9. The aspirator system of claim 8, wherein a shape of the plurality of seams resembles rings arranged along the length of the aspirator barrel.

10. The aspirator system of claim 8, wherein a shape of the plurality of seams resembles a helix along the length of the aspirator barrel.

11. An airplane comprising:
an inflatable evacuation device configured to be inflated when deployed;
a charged gas cylinder configured to provide high-pressure gas for inflating the inflatable evacuation device; and
an aspirator system comprising:
an aspirator body having a plurality of flapper doors configured to open to allow intake of atmospheric gas;
an aspirator barrel connecting the aspirator body to the inflatable evacuation device, having connected inflation chambers wrapping around a circumference of the aspirator barrel and arranged along a length of the aspirator barrel, and being configured to provide an aspirator barrel chamber for guiding the atmospheric gas to the inflatable evacuation device in response to the aspirator barrel being inflated; and
a showerhead nozzle disposed within the aspirator body, connected to the connected inflation chambers, configured to direct a first portion of the high-pressure gas from the charged gas cylinder to the connected inflation chambers to inflate the aspirator barrel, and configured to direct a second portion of the high-pressure gas from the charged gas cylinder through the aspirator barrel and compel intake of atmospheric gas through the plurality of flapper doors, to inflate the inflatable evacuation device;
wherein the aspirator barrel comprises a relief valve configured to release gas into the aspirator barrel chamber in response to a pressure inside the connected inflation chambers exceeding a threshold pressure.

12. The airplane of claim 11, wherein the aspirator barrel comprises a first end connected to the aspirator body and a second end connected to the inflatable evacuation device, and wherein a diameter of the aspirator barrel at the first end is smaller than a diameter of the aspirator barrel at the second end.

13. The airplane of claim 11, wherein the connected inflation chambers are separated by a plurality of seams resembling a helix along the length of the aspirator barrel.

* * * * *